United States Patent [19]
Kim

[11] Patent Number: 5,828,790
[45] Date of Patent: Oct. 27, 1998

[54] METHOD AND APPARATUS FOR APPROXIMATING A CONTOUR IMAGE OF AN OBJECT IN A VIDEO SIGNAL

[75] Inventor: Jin-Hun Kim, Seoul, Rep. of Korea

[73] Assignee: Daewoo Electronics Co., Ltd., Seoul, Rep. of Korea

[21] Appl. No.: 769,833

[22] Filed: Dec. 20, 1996

[30] Foreign Application Priority Data

Dec. 23, 1995 [KR] Rep. of Korea ............ 95-55661

[51] Int. Cl.$^6$ ................................ G06K 9/00
[52] U.S. Cl. .......................... 382/242; 382/199
[58] Field of Search .................. 348/416, 420;
382/242, 236, 250, 181, 190, 195, 196,
197, 199, 201, 203, 204, 205, 209, 217,
224, 225, 228, 232, 233, 235, 237, 238,
239, 241, 243, 244, 248, 251, 270, 271,
272, 282, 293; 358/433, 426, 261-3, 428,
430, 432

[56] References Cited

U.S. PATENT DOCUMENTS 5,635,986  6/1997  Kim ........................ 348/416
5,737,449  4/1998  Lee ........................ 382/242

FOREIGN PATENT DOCUMENTS 0 734 163 A2  9/1996  European Pat. Off. ........ H04N 7/26

*Primary Examiner*—Leo H. Boudreau
*Assistant Examiner*—Bijan Tadayon
*Attorney, Agent, or Firm*—Pennie & Edmonds LLP

[57] ABSTRACT

A method for approximating a contour of an object expressed in a digital video signal divides the contour into a multiplicity of primary contour segments and approximates each primary contour segment by a primary line segment, to thereby calculate a set of errors between the primary contour segment and the primary line segment for each primary contour segment. And the method codes and decodes the set of errors, to thereby generate of a set of reconstructed errors and a reconstructed contour segment which are used to determine a reconstruction error. Thereafter, the method generates one or more secondary contour segment on the primary contour segment with each secondary contour segments approximated by a secondary line segment. Subsequently, the method finds an approximation error and approximates said each primary contour segment by using either the reconstructed contour segment or the secondary line segments based on the reconstruction error and the approximation error.

20 Claims, 6 Drawing Sheets

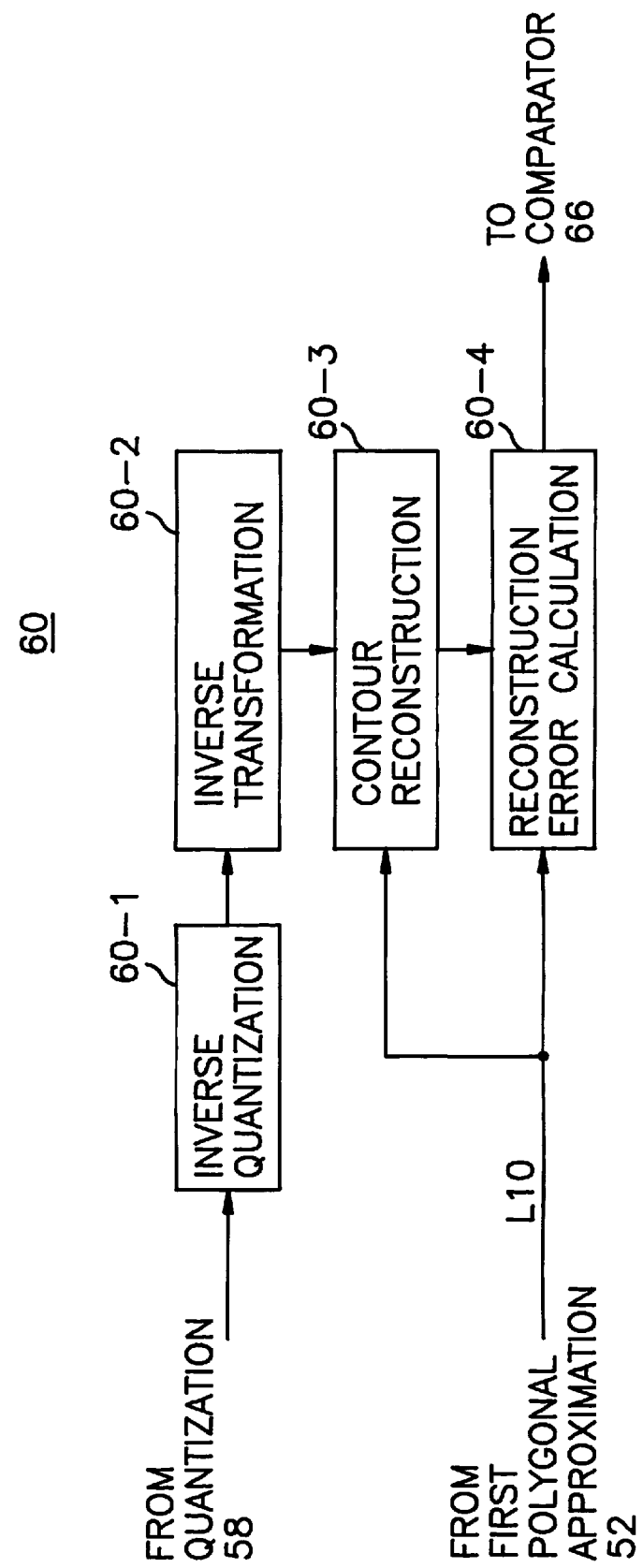

METHOD AND APPARATUS FOR APPROXIMATING A CONTOUR IMAGE OF AN OBJECT IN A VIDEO SIGNAL

FIELD OF THE INVENTION

The present invention relates to a method and apparatus for encoding a contour of an object in a video signal; and, more particularly, to a method and apparatus capable of reducing approximation errors of the contour through the use of an adaptive coding scheme based on a polygonal approximation and a transform techniques.

DESCRIPTION OF THE PRIOR ART

In digitally televised systems such as video-telephone, teleconference and high definition television systems, a large amount of digital data is needed to define each video frame signal since a video line signal in the video frame signal comprises a sequence of digital data referred to as pixel values. Since, however, the available frequency bandwidth of a conventional transmission channel is limited, in order to transmit the large amount of digital data therethrough, it is necessary to compress or reduce the volume of data through the use of various data compression techniques, especially, in the case of such low bit-rate video signal encoders as video-telephone and teleconference systems.

One of such techniques for encoding video signals for a low bit-rate encoding system is an object-oriented analysis-synthesis coding technique, wherein an input video image is divided into objects and three sets of parameters for defining the motion, the contour and the pixel data of each object are processed through different encoding channels.

In processing a contour of an object, contour information is important for the analysis and synthesis of the object shape. A classical coding method for representing the contour information is a chain coding method. The chain coding method, however, requires a substantial amount of bits for the representation thereof, although the method does not incur any loss in the contour information.

To overcome the drawback, therefore, there have been proposed several methods to encode the contour information such as polygonal approximation and B-spline approximation. One of the disadvantages in the polygonal approximation is the roughness in the representation of the contour. The B-spline approximation is, on the other hand, capable of representing the contour more precisely; however, it requires a high-order polynomial to reduce the approximation error and results in an increased overall computational complexity of the video encoder.

One of the techniques introduced to ameliorate such problems associated with the rough representation of the contour and the increased computational complexity in the above approximation approaches is a contour approximation technique employing a discrete sine transform(DST).

In an apparatus which adopts the contour approximation technique based on the polygonal approximation and the DST, as disclosed in a commonly owned copending application, U.S. Ser. No. 08 423,604, entitled "A CONTOUR APPROXIMATION APPARATUS FOR REPRESENTING A CONTOUR OF AN OBJECT", a number of vertex points are determined and the contour of an object is approximated through the use of polygonal approximation for fitting the contour by line segments. And, N sample points on each line segment are selected and an approximation error at each of the N sample points located on each line segment is sequentially calculated in order to obtain a set of approximation errors for each line segment. Thereafter, sets of DST coefficients are generated by performing a one-dimensional DST operation on each set of approximation errors.

Even though it is possible to remedy the rough representation and computational complexity and reduce the volume of transmission data through the use of the DST-based contour approximation, it still remains desirable to further reduce the volume of transmission data in order to efficiently implement a low-bit rate codec system having, e.g., a 64 kb/s transmission channel bandwidth.

SUMMARY OF THE INVENTION

It is, therefore, a primary object of the invention to provide an improved method and apparatus for approximating a contour of an object in a video signal, which is capable of further reducing the approximation error through properly selecting a approximation method according to a contour segment.

In accordance with the invention, there is provided a method for approximating a contour of an object expressed in a digital video signal, comprising the steps of:

(a) dividing the contour into a multiplicity of primary contour segments and approximating each primary contour segment by a primary line segment joining two end points of said each primary contour segment;

(b) calculating, for said each primary contour segment, a set of errors which represents a difference between said each primary contour segment and the primary line segment corresponding thereto;

(c) coding the set of errors to provide a set of coded errors;

(d) decoding the set of coded errors to generate a set of reconstructed errors;

(e) generating a reconstructed contour segment based on the set of reconstructed errors;

(f) determining a reconstruction error representing a difference between said each primary contour segment and the constructed contour segment;

(g) generating one or more secondary contour segment on the primary contour segment and approximating each secondary contour segment by a secondary line segment joining two end points of said each secondary contour segment;

(h) finding an approximation error representing a difference between said each primary contour segment and the secondary line segment(s); and (i) approximating said each primary contour segment by using either the reconstructed contour segment or the secondary line segment(s) based on the reconstruction error and the approximation error.

BRIEF DESCRIPTION OF THE DRAWINGS

The above and other objects and features of the present invention will become apparent from the following description of preferred embodiments given in conjunction with the accompanying drawings, in which:

FIG. 1B illustrates a detailed block diagram of the first error calculation block presented in Fig. 1A;

DETAILED DESCRIPTION OF THE PREFERRED EMBODIMENTS

Figure 1A:
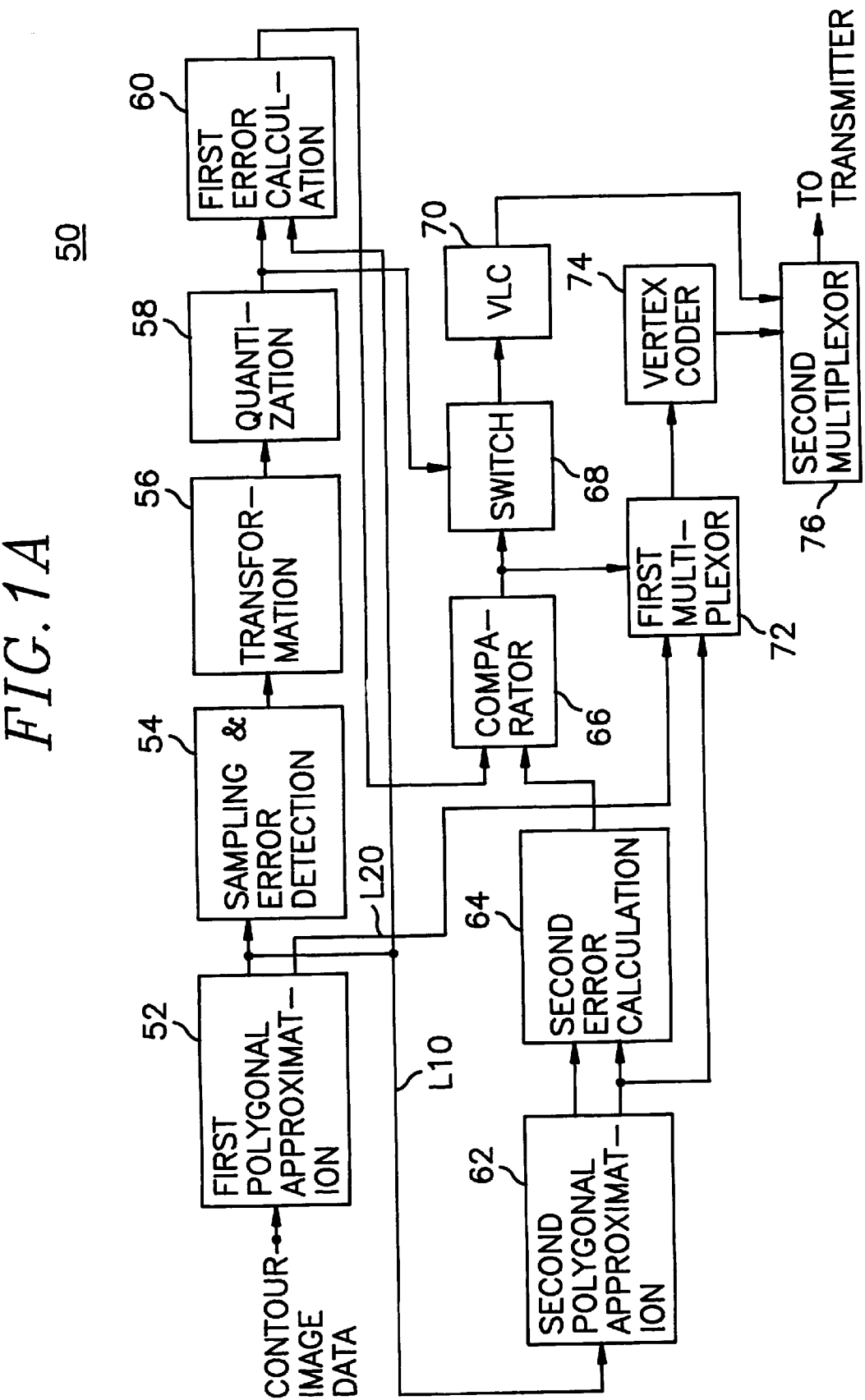
FIG. 1A shows a schematic block diagram of the inventive apparatus for approximating a contour of an object.

Referring to FIG. 1A, there is shown a schematic block diagram of the inventive apparatus 50 for encoding a contour of an object expressed in a video signal in accordance with the present invention.

Contour image data of the object in the video signal is inputted to a first polygonal approximation block 52, the contour image data representing position information of contour pixels constituting the contour of the object.

At the first polygonal approximation block 52, a plurality of primary vertices are determined on the contour through the use of the conventional polygonal approximation technique based on a predetermined threshold TH1. By performing the polygonal approximation, the contour is divided into a multiplicity of primary contour segments. Each of the primary contour segments represents a portion of the contour made of two adjacent primary vertices along the contour and contour pixels disposed therebetween and is approximated by a primary line segment joining the two adjacent primary vertices. The first polygonal approximation block 52 sequentially provides for each of the primary contour segments primary contour segment data to a sampling and error detection block 54, a first error calculation block 60 and a second polygonal approximation block 62 via a line L10 and primary vertex data to a first multiplexor 72 via a line L20, the primary contour segment data representing position information of contour pixels and primary vertices constituting a primary contour segment and the primary vertex data denoting position information of the primary vertices included in the primary contour segment.

Referring to FIGS. 2A to 2D, there is illustrated a first polygonal approximation process to an exemplary contour 10.

As the contour 10 is of an open loop, two end points, e.g., A and B, are selected as starting primary vertices. On the other hand, if the contour to be approximated is of a closed loop, two farthest points on the contour are selected as the starting primary vertices. And then, the farthest point on the contour 10 from a line segment AB, e.g., C, is determined. If the distance $D_{max}$ from the point C to the line segment AB is greater than a predetermined threshold TH1, the point C is selected as a primary vertex. This procedure is repeated until the $D_{max}$ for each line segment connecting two adjacent primary vertices along the contour 10 becomes equal to or smaller than the predetermined threshold TH1.

Figure 2A:
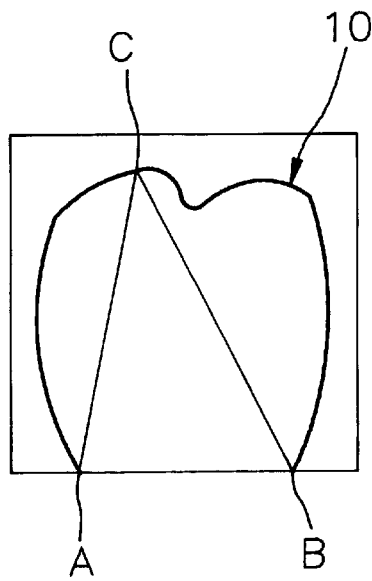
FIGS. 2A to 2D offer a polygonal approximation process.
Figure 2B:
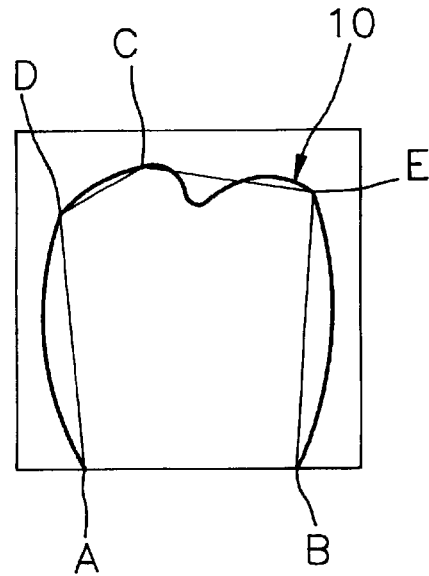
Figure 2C:
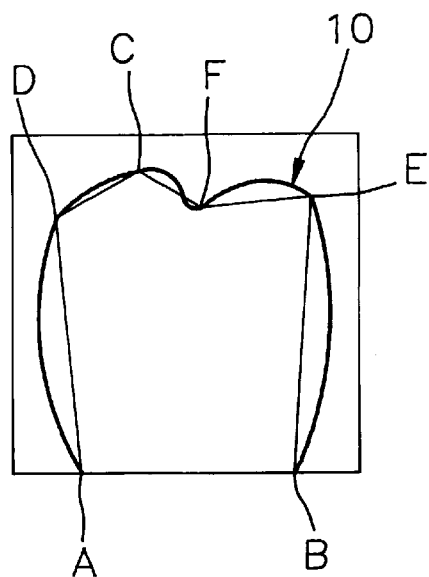
Figure 2D:
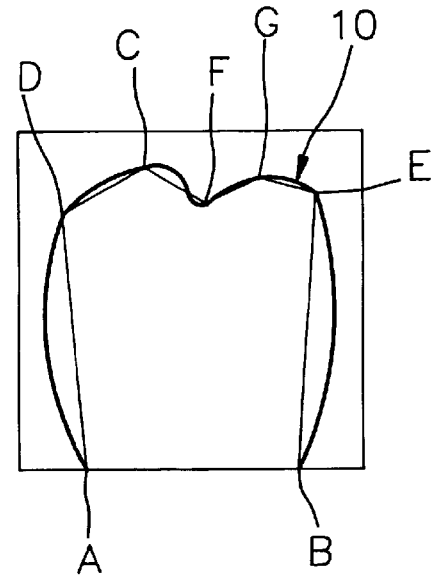

As a result of the above procedure, the primary vertices, e.g., A to G, the primary contour segments, e.g., curve AD to curve EB, and the primary line segments, e.g., AD to EB, are produced as shown in FIG. 2D.

The number of primary vertex points depends on the predetermined threshold TH 1. As can be seen from FIGS. 2A to 2D, the approximation of the contour 10 with primary line segments becomes more similar to the contour 10 as the predetermined threshold TH 1 becomes smaller, at the expense of coding efficiency. Therefore the threshold TH 1 is determined under the consideration of the amount of data to be transmitted.

Referring back to Fig. 1A, the sampling & error detection block 54, responsive to primary contour segment data for a primary contour segment, takes N sample points on a primary line segment joining vertices of the primary contour segment in a predetermined manner; and calculates an error at each sample point, to thereby provide a set of errors for the primary contour segment to a transformation block 56, N being a positive integer, wherein the sample points on the primary line segment are equi-distanced from each other in a preferred embodiment of the invention.

And the error represents a displacement from a sample point to an intersection formed by the primary contour segment and a line drawn normal to the primary line segment from the sample point, the error including a distance between the sample point and the intersection and a sign indicating a relative position of the intersection with respect to the primary line segment.

Figure 3A:
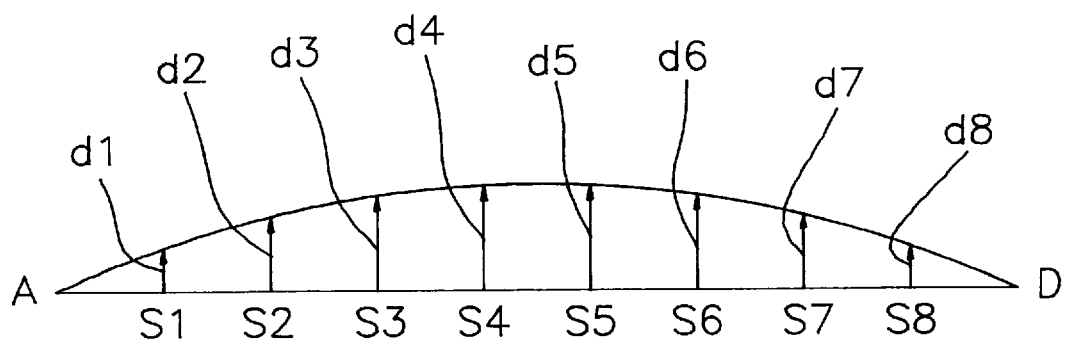
FIGS. 3A and 3B provide exemplary diagrams, each representing errors between a line segment joining two vertex points and its corresponding contour segment.
Figure 3B:
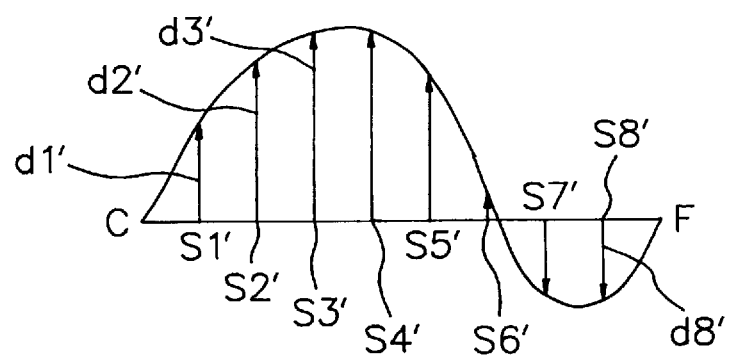

Referring to FIG. 3A or 3B, there is illustrated an exemplary diagram representing errors between the primary line segment AD or CF and its corresponding primary contour segment, wherein the displacement, e.g., d1 or d1' from a sample point S1 on the primary line segment AD or a sample point S1' on the primary line segment CF to its corresponding intersection on the primary contour segment represents the error at the sample point S1 or S1' respectively; and the displacements d1 to d8 at the sample points S1 to S8 and d1' to d8' at the sample points S1' to S8' are the elements of a set of errors for the primary line segment AD and CF, respectively.

Returning back to Fig. 1A, the transformation block 56 performs one-dimensional transform operation on the set of errors from the sampling & error detection block 54 by using a predetermined transform method, e.g., discrete sine transform (DST) or discrete cosine transform (DCT), to thereby produce a set of transform coefficients for each set of errors and provide same to a quantization block 58.

The quantization block 58 quantizes the set of transform coefficients from the transformation block 56 and provides a set of quantized transform coefficients to the first error calculation block 60 and a switch 68.

Figure 4A:
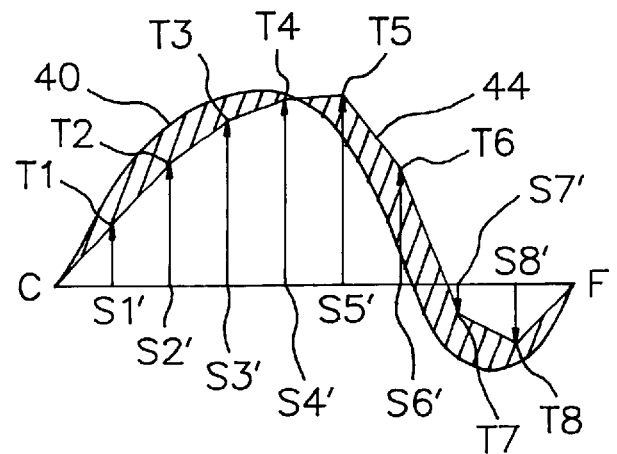
FIGS. 4A and 4B depict schematic representation of a reconstruction and a polygonal approximation errors in accordance with a preferred embodiment of the invention.

Referring to FIG. 1B, there is illustrated a detailed block diagram of the first error calculation block 60 shown in FIG. 1A. The first error calculation block 60 includes therein an inverse quantization block 60-1, an inverse transformation block 60-2, a contour reconstruction block 60-3 and a reconstruction error calculation block 60-4. At the inverse quantization block 60-1, the set of quantized transform coefficients from the quantization block 58 is inversely quantized to provide a set of reconstructed transform coefficients. The set of reconstructed transform coefficients is then inverse transformed into a set of reconstructed errors at the inverse transformation block 60-2. The contour reconstruction block 60-3, responsive to the primary contour segment data on the line L10 and the set of reconstructed errors from the inverse transformation block 60-2, generates a reconstructed contour segment, e.g., a segment 44 shown in FIG. 4A, wherein a segment 40 represents the primary contour segment CF and the reconstructed contour segment CF represented by the numeral 44 is formed by lines joining, in sequence, the primary vertex C, reconstructed intersections T1 to T8 obtained by using the reconstructed errors and the primary vertex F. Finally, at the reconstruction error calculation block 60-4, a reconstruction error between the primary contour segment provided on the line L10 and the reconstructed contour segment from the contour reconstruction block 60-3 is determined and a reconstruction error value representing the amount of the determined reconstruction error is evaluated in accordance with error evaluation schemes which will be described with reference to FIGS. 4A to 5B. The reconstruction error value is fed to a comparator 66.

Figure 4B:
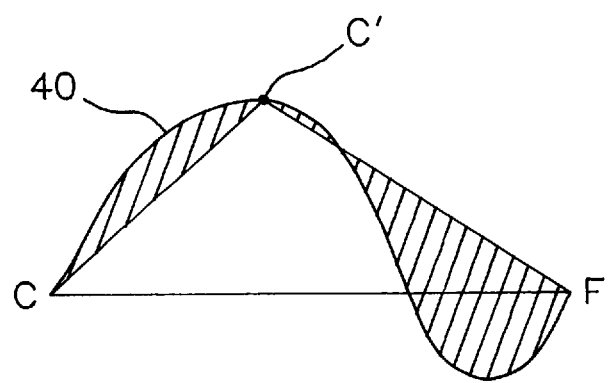

In the meantime, at the second polygonal approximation block 62 shown in Fig. 1A, a second polygonal approximation is carried out, based on a preset threshold TH2, on the primary contour segment provided on the line L10 in an identical manner as in the first polygonal approximation block 52, to thereby determine, if any, one or more secondary vertices on the primary contour segment, wherein the preset threshold TH2 is smaller than the predetermined threshold TH1 and the primary contour segment is approximated by the secondary line segments, each of which joining two adjacent secondary vertices along the primary contour segment. For instance, if a secondary vertex C' is determined on the primary contour segment 40 as shown in FIG. 4B, the primary contour segment 40 is approximated by a secondary line segment connecting the primary vertex C and the secondary vertex C' and the one joining the secondary vertex C' and the primary vertex F. The second polygonal approximation block 62 provides a second error calculation block 64 with secondary vertex data representing position information of the secondary vertices and the primary contour segment data. The secondary vertex data is also provided to the first multiplexor 72.

The second error calculation block 64 determines a polygonal approximation error between the primary contour segment and the secondary line segments in a same fashion as in the reconstruction error calculation block 60-4, to thereby provide a polygonal approximation error value representing the amount of the polygonal approximation error to the comparator 66.

Referring to FIGS. 4A to 5B, there are illustrated error determination schemes employed in determining the reconstruction error and the polygonal approximation error at the reconstruction error calculation block 60-4 and the second error calculation block 64, respectively.

In a preferred embodiment of the invention, the regions enclosed by the primary contour segment and the reconstructed contour segment and those confined by the primary contour segment and the secondary line segments are determined as the reconstruction and polygonal approximation errors; and the error values thereof are represented by the areas of the regions, respectively. For instance, the reconstruction error value for the primary contour segment 40 is the area of the shaded regions enclosed by the contour segments 40 and reconstructed contour segment 44 shown in FIG. 4A. Likewise, the polygonal approximation error value for the contour segment 40 is represented by the area of the shaded regions defined by the contour segment 40 and the secondary line segments CC' and C' F as shown in FIG. 4B. In another preferred embodiment of the invention, the error values are represented by the number of pixels residing at the shaded regions in lieu of the areas thereof.

Figure 5A:
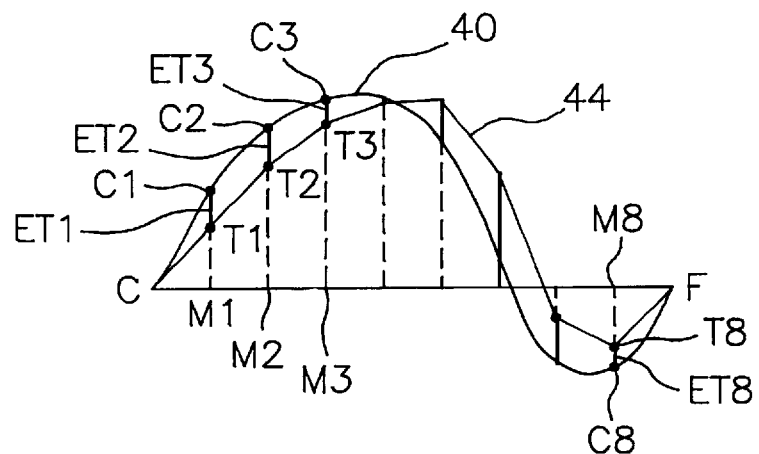
FIGS. 5A and 5B describe another preferred embodiment of the invention for evaluating a reconstruction and a polygonal approximation errors for a contour segment.
Figure 5B:
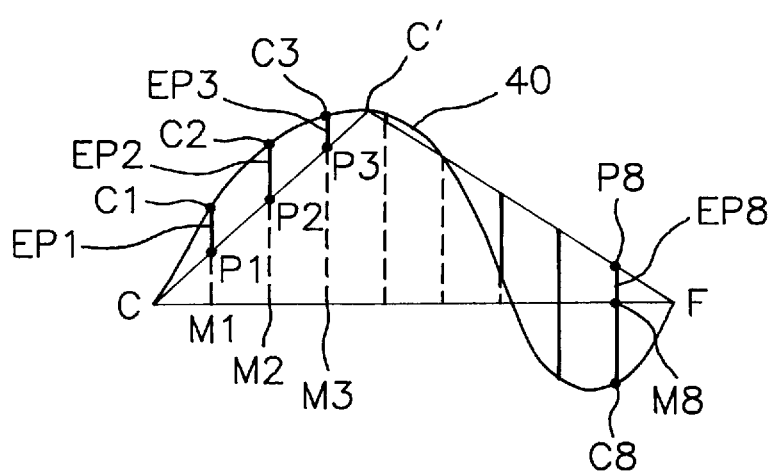

Referring to FIGS. 5A and 5B, there are depicted an error determination scheme in accordance with a third preferred embodiment of the invention. In the third error detection scheme, M number of, e.g., 8, sampling points are determined on the primary line segment CF. Thereafter, a line normal to the primary line segment CF is drawn at each of the sampling points, e.g., M1 to M8; and intersection points are determined on the primary contour segment 40, the reconstructed contour segment 44 and the secondary line segments CC' and C' F, each of the intersection points representing a point at which each normal line crosses one of those contour segments and the secondary line segments. In a manner described above, intersection points C1 to C8 are determined on the primary contour segment 40; intersection points T1 to T8, on the reconstructed contour segment 44; and intersection points P1 to P8, on the secondary line segments CC' and C' F. The reconstruction error is defined by the distances between the intersection points of respective normal lines with respective to the contour segments 40 and reconstructed contour segment 44. In other words, the reconstruction error value is obtained by summing the distance ETi between the intersection points Ci and Ti on the contour segment 40 and reconstructed contour segment 44 as shown in FIG. 5A, over from i=1 to i=8. Likewise, the polygonal approximation error value is found by summing the distances EP1 to EP8 between the intersection points C1 to C8 on the primary contour segment 40 and the respective intersection points P1 to P8 on the secondary line segments CC' and C' F. It should be noted, however, that the error value can be evaluated in a different manner, e.g., by summing the squared distances, as long as the manner represents a measure systematically reflecting the amount of error.

Referring back to FIG. 1A, the comparator 66 compares the reconstruction error value from the reconstruction error calculation block 60-4 and the polygonal approximation error value from the second error calculation block 64 and provides the switch 68 and the first multiplexor 72 with a first or a second control signal depending on the comparison result. That is, the comparator 66 generates the first control signal if the reconstruction error value is smaller than the polygonal approximation error value and the second control signal, if otherwise.

The switch 68 transfers, in response to the first control signal, the set of quantized transform coefficients from the quantization block 58 to a VLC (variable length coding) block 70, wherein the set of quantized transform coefficients is VLC coded to provide VLC code data for the primary contour segment, e.g., contour segment 40 shown in FIG. 4B, to a second multiplexor 76.

The switch 68 cuts off the path leading from the quantization block 58 to the VLC block 70, if the second control signal is fed thereto.

The first multiplexor 72 selectively provides, for each of the primary contour segments, e.g., the contour segment 40 shown in FIG. 4B, the secondary vertex data from the second polygonal approximation block 62 or the primary vertex data from the first polygonal approximation block 52 to a vertex coder 74 according to the output from the comparator 66. In case the output from the comparator 66 is the first control signal, only the primary vertex data is selected and fed to a vertex coder 74; otherwise, the primary and the secondary vertex data are multiplexed and provided to the vertex coder 74, wherein the multiplexed vertex data has a sequence corresponding to the one of the vertices on the contour segment. For instance, the position information of the vertices for the primary contour segment CF shown in FIG. 4B is multiplexed in a sequence of the vertices C, C' and F as appearing thereon.

At the vertex coder 74, the multiplexed vertex data for the primary contour segments, e.g., AD to EB shown in FIG. 2D is coded by using, e.g., arithmetic coding technique. The coded vertex data is then provided to the second multiplexor 76 and multiplexed therein together with VLC coded data from the VLC block 70 to provide coded contour data. The coded contour data is transmitted to a transmitter (not shown) for the transmission thereof.

The choice of the thresholds TH1 and TH2 is critical to the performance of the encoder of the present invention. That is, if the threshold TH2 is too much smaller than the threshold TH1, the polygonal approximation error would be smaller than the reconstruction error for almost all the primary contour segments and therefore, the secondary vertex data would be selected at the multiplexor 72 and encoded, irrespective of the shape of the contour which might have been advantageously approximated by transform with a reduced number of bits to be transmitted. As a result, the amount of data to be transmitted increases to represent the abundant secondary vertices. Likewise, if the difference between TH1 and TH2 is not considerable, the amount of data to be transmitted increases to represent almost all the sets of quantized transform coefficients as well as primary vertex data albeit that some portions of the contour might have been effectively represented by the secondary vertices. Therefore, the determination of the thresholds TH1 and TH2 should be made in such a way that the number of encoded bits generated by both of the coding schemes meets the target transmission bit rate required by the system.

While the present invention has been described with respect to the particular embodiments, it will be apparent to those skilled in the art that various changes and modifications may be made without departing from the spirit and scope of the invention as defined in the following claims.

What is claimed is:

1. A method for approximating a contour of an object expressed in a digital video signal, the method comprising the steps of:

(a) dividing the contour into a multiplicity of primary contour segments and approximating each primary contour segment by a primary line segment joining two end points of said each primary contour segment;

(b) calculating, for said each primary contour segment, a set of errors which represents a difference between said each primary contour segment and the primary line segment corresponding thereto;

(c) coding the set of errors to provide a set of coded errors;

(d) decoding the set of coded errors to generate a set of reconstructed errors;

(e) generating a reconstructed contour segment based on the set of reconstructed errors;

(f) determining a reconstruction error representing a difference between said each primary contour segment and the reconstructed contour segment;

(g) generating one or more secondary contour segments on the primary contour segment and approximating each secondary contour segment by a secondary line segment joining two end points of said each secondary contour segment;

(h) finding an approximation error representing a difference between said each primary contour segment and the secondary line segment(s); and (i) approximating said each primary contour segment by either the reconstructed contour segment or the secondary line segment(s) based on the reconstruction error and the approximation error.

2. The method according to claim 1, wherein said step (b) includes the steps of:

(b1) taking N sample points on the primary line segment, N being a positive integer; and (b2) determining the set of errors at the sample points, each of the errors representing a displacement from a sample point to an intersection which is formed by said each primary contour segment and a line normal to the primary line segment at the sample point.

3. The method according to claim 2, wherein said N sample points are equi-distanced on the primary line segment.

4. The method according to claim 2, wherein said displacement is represented by a distance between the sample point and the intersection and a sign denoting a relative position of the intersection with respect to the primary line segment.

5. The method according to claim 1, wherein said coding step (c) is carried out by using a transform and a quantization techniques and said decoding step (d) is carried out by using an inverse transform and an inverse quantization techniques.

6. The method according to claim 1, wherein said reconstruction error is defined by an area of one or more regions enclosed by said each primary contour segment and the reconstructed contour segment and said approximation error is defined by an area of one or more regions enclosed by said each primary contour segment and the secondary line segment(s).

7. The method according to claim 1, wherein said reconstruction error is defined by the number of pixels in one or more regions enclosed by said each primary contour segment and the reconstructed contour segment and said approximation error is defined by the number of pixels residing in one or more regions confined by said each primary contour segment and the secondary line segment(s).

8. The method according to claim 1, wherein said step(f) includes the steps of:

(f1) taking K sampling points on said each primary contour segment, K being a positive integer;

(f2) drawing a line normal to the primary line segment at each sampling point;

(f3) finding, for each sampling point, a distance between an intersection point formed by the line and said each primary contour segment and an intersection point made by the line and the reconstructed contour segment; and (f4) obtaining the reconstructed error based on the distances for the sampling points, and said step (h) includes the steps of:

(h1) performing said steps (f1) and (f2);

(h2) finding, for each sampling point, a distance between the intersection point formed by the line and said primary contour segment and an intersection point made by the line and one of the secondary line segments; and (h3) determining the approximation error based on the distances formed in step (h2).

9. The method according to claim 8, wherein said reconstruction error is defined by a sum of the distances found in step (f3) and said approximation error is defined by a sum of the distances found in step (h2).

10. The method according to claim 1, wherein said dividing step (a) and said generating step (g) are carried out based on a polygonal approximation by using thresholds TH1 and TH2, respectively, with the threshold TH1 being greater than the threshold TH2, a distance between any point on said each primary contour segment and the primary line segment being smaller than the threshold TH1, and a distance between any point on each secondary contour segment and a secondary line segment corresponding thereto being smaller than the threshold TH2.

11. An apparatus for encoding a contour of an object expressed in a digital video signal, the contour having contour pixels thereon, the apparatus comprising:

means for polygonal-approximating the contour by using a threshold TH1, wherein the contour is divided into a multiplicity of primary contour segments and each primary contour segment is approximated by a primary line segment joining two end points of said each primary contour segment, a distance between the primary line segment and any contour pixel residing at said each primary contour segment being not greater than the threshold TH1;

means for calculating, for said each primary contour segment, a set of errors which represents a difference between said each primary contour segment and the primary line segment;

means for coding the set of errors to provide a set of coded errors;

means for decoding the set of coded errors to generate a set of reconstructed errors;

means for providing a reconstructed contour segment based on the set of reconstructed errors;

means for determining a reconstruction error representing a difference between said each primary contour segment and the reconstructed contour segment;

means for polygonal-approximating said each primary contour segment based on a threshold TH2, wherein said each primary contour segment is divided into one or more secondary contour segments and each secondary contour segment is approximated by a secondary line segment joining two end points of said each secondary contour segment, a distance between the secondary line segment and any contour pixel disposed on said each secondary contour segment being not greater than the threshold TH2;

means for finding an approximation error representing a difference between said each primary contour segment and the secondary line segment(s);

means for selecting, based on the reconstruction and the approximation errors, reconstruction or approximation data as selected data, wherein the reconstruction data includes the set of coded errors and position information of the end points of said each primary contour segment and the approximation data includes position information of end points of the secondary line segment(s); and means for encoding the selected data.

12. The apparatus according to claim 11, wherein said selecting means includes:

means for comparing the reconstruction error and the approximation error; and means for selecting the reconstruction data as the selected data if the reconstruction error is smaller than the approximation error and selecting the approximation data as the selected data, if otherwise.

13. The apparatus according to claim 11, wherein said calculating means includes:

means for taking N sample points on the primary line segment, N being a positive integer; and means for determining the set of errors at the sample points, each of the errors representing a displacement from a sample point to an intersection which is formed by said each primary contour segment and a line normal to the primary line segment at the sample point.

14. The apparatus according to claim 13, wherein said sample points are equi-distanced on the primary line segment.

15. The apparatus according to claim 13, wherein said displacement is represented by a distance between the sample point and the intersection and a sign denoting a relative position of the intersection with respect to the primary line segment.

16. The apparatus according to claim 11, wherein said coding means includes:

means for transforming the set of errors to provide a set of transform coefficients; and means for quantizing the set of transform coefficients to provide the set of coded errors, and said decoding means includes:

means for inverse-quantizing the set of coded errors to provide a set of reconstructed transform coefficients; and means for inverse-transforming the set of reconstructed transform coefficients to generate the set of reconstructed errors.

17. The apparatus according to claim 16, wherein said set of errors is transformed by a discrete sine transform technique.

18. The apparatus according to claim 11, wherein said reconstruction error is defined by an area of one or more regions enclosed by said each primary contour segment and the reconstructed contour segment and said approximation error is defined by an area of one or more regions enclosed by said each primary contour segment and the secondary line segment(s).

19. The apparatus according to claim 11, wherein said means for determining the reconstruction error includes:

means for taking K number of first sampling points on said each primary contour segment, K being a positive integer;

means for drawing a line normal to the primary line segment at each first sampling point;

means for determining a first distance, for each first sampling point, between and intersection point formed by the normal line and said each primary contour segment and an intersection point made by the normal line and the reconstructed contour segment; and means for obtaining the reconstruction error based on the first distances for the first sampling points, and said means for finding the approximation error includes:

means for taking K number of second sampling points on said each primary contour segment;

means for drawing a line vertical to the primary line segment at each second sampling point;

means for calculating, for each second sampling point, a second distance between an intersection point formed by the vertical line and said each primary contour segment and an intersection point made by the vertical line and one of the second line segments; and means for determining the approximation error based on the second distances for the second sampling points.

20. The apparatus according to claim 19, wherein said reconstruction error is defined by a sum of the first distances and said approximation error is defined by a sum of the second distances.

* * * * *